United States Patent [19]

Thompson

[11] 4,250,633

[45] Feb. 17, 1981

[54] EDUCATIONAL MACHINE

[76] Inventor: Donald R. Thompson, 2628 E. Turquoise Dr., Phoenix, Ariz. 85028

[21] Appl. No.: 19,740

[22] Filed: Mar. 12, 1979

[51] Int. Cl.$^3$ ............................................... G09B 3/00
[52] U.S. Cl. .................................................... 434/327
[58] Field of Search ........................... 35/9 R, 9 A, 9 B

[56] References Cited

U.S. PATENT DOCUMENTS

| 335,837 | 2/1886 | Peckham | 35/9 R X |
|---|---|---|---|
| 1,385,623 | 7/1921 | Kellogg | 35/1 X |
| 2,652,635 | 9/1953 | Conger | 35/9 R |
| 3,154,863 | 11/1964 | La Prelle | 35/9 R |
| 4,053,994 | 10/1977 | Gess | 35/9 R |

*Primary Examiner*—William H. Grieb

*Attorney, Agent, or Firm*—Cahill, Sutton & Thomas

[57] ABSTRACT

An educational machine includes a plurality of cards arranged in a predetermined order. Each card has a first side and a second side. Information on the first side of each of said cards, respectively, corresponds to information on the second side of a respective preceding one of said cards. The educational machine includes a slot into which the cards are inserted in a predetermined order such that the first side is oriented upward. The educational machine also includes internal apparatus for inverting the cards and a apparatus for ejecting the inverted cards so that their second side is oriented upward. An ejected card contains information on its second side corresponding to information on the first side of the card being inserted.

12 Claims, 6 Drawing Figures

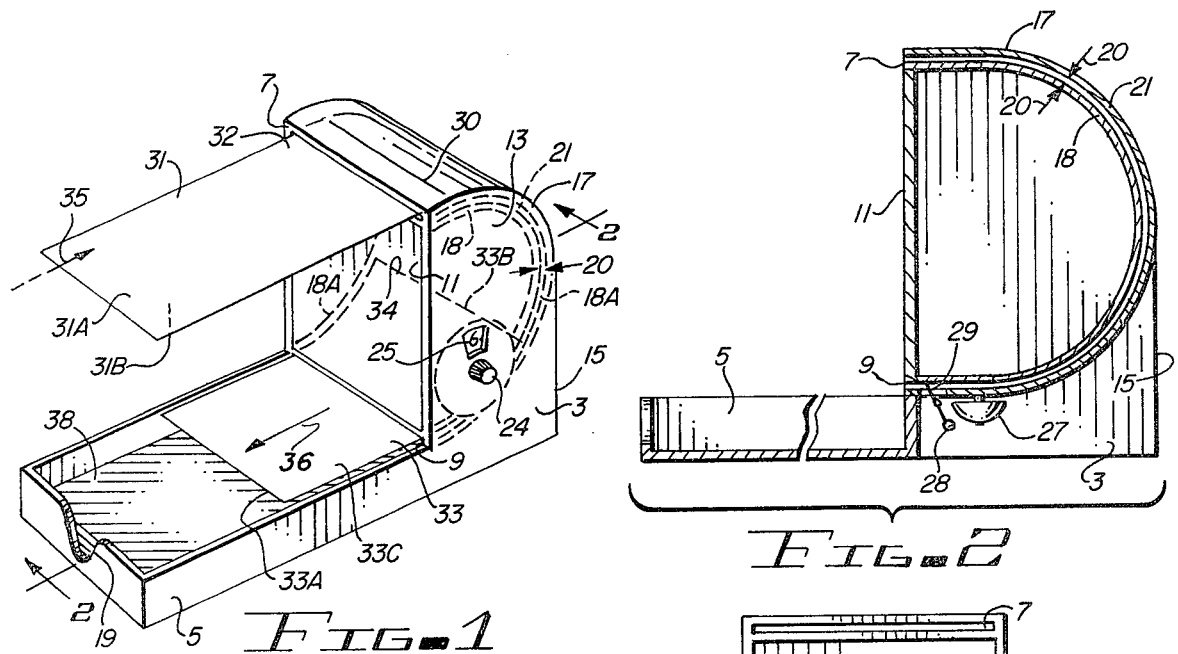
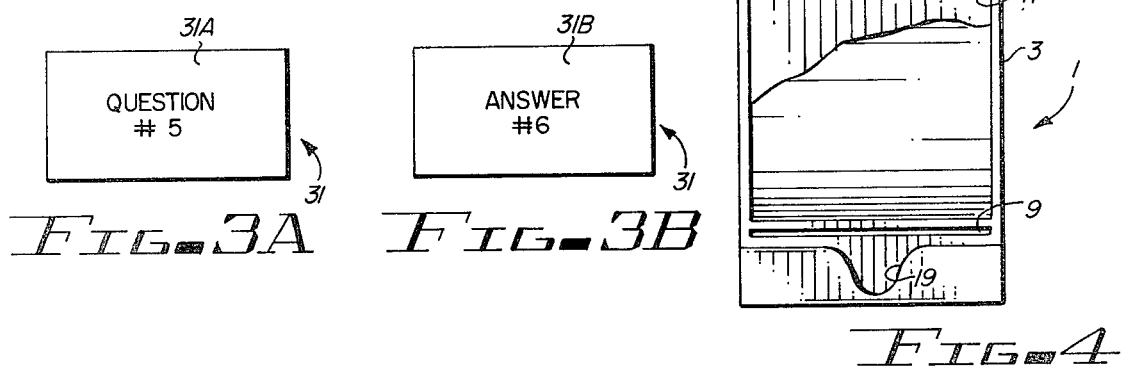
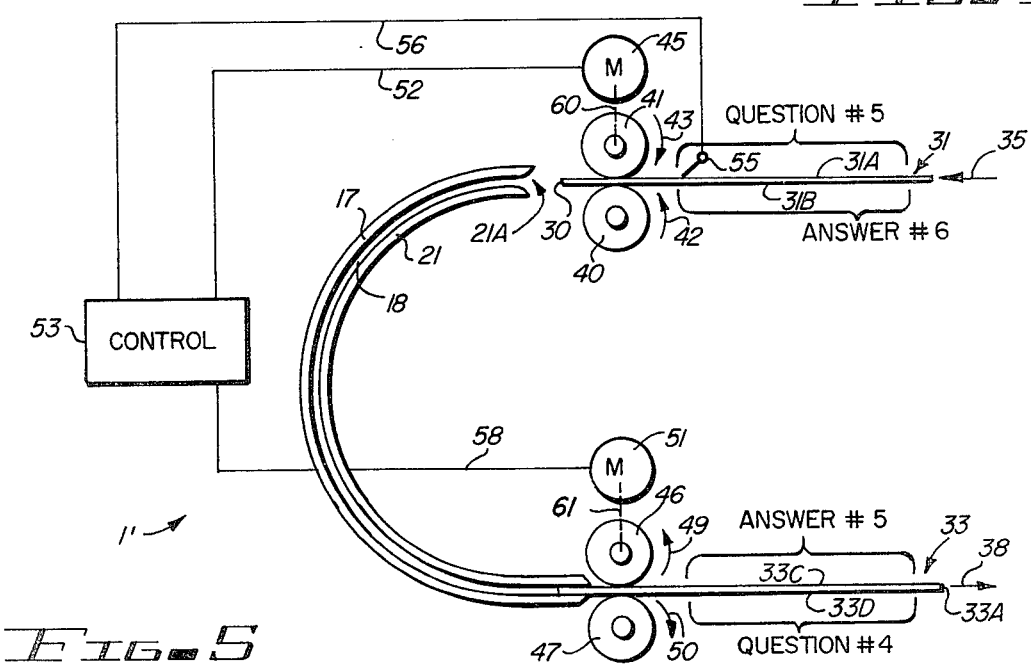

EDUCATIONAL MACHINE

BACKGROUND OF THE INVENTION

1. Field of the Invention

The invention relates to educational machines, and more particularly, to educational machines for sequentially receiving and ejecting cards having information on both sides.

2. Description of the Prior Art

Systems of educational cards, each card having a question on its front side and a corresponding answer on its back side, are commonly used by teachers and parents in the course of teaching activities directed to their students or children. Such systems of educational cards are especially useful in teaching certain subjects, such as spelling, arithmetic, and word/object identification to small children. A large number of such cards may be arranged or programmed in a predetermined sequence to improve the efficiency of learning of a particular category of subject matter by teaching the subject matter to a child in a logical sequence. However, use of educational cards alone as an educational tool has been found to have certain difficulties. For example, some children, if not closely supervised during their use of the above educational tools, may "cheat" by looking quickly at the answer on the back side of a particular card without making any mental effort to recall or cognitively determine the correct answer to a question presented on the front side of the card. This, of course, reduces the benefits of using the educational cards. Another shortcoming of using educational cards alone is that certain children may tend to become bored by the task of merely looking at the question at the front of a card, trying to answer the question, and then turning the card over to determine the correct answer. Such children may be prone to mixing the cards up, tearing or otherwise defacing the cards. A variety of devices have been devised for use in conjunction with educational cards of the type described above in order to make use of the educational cards more interesting and fascinating to children and to facilitate maintaining the cards in a predetermined order.

A preliminary search directed to the present invention uncovered U.S. Pat. Nos. 1,385,623, 3,154,863 and 4,053,994. The device disclosed in U.S. Pat. No. 4,053,994 comes closest to solving the above mentioned shortcomings of using educational cards alone, and is a relatively inexpensive device. While use of the device disclosed in U.S. Pat. No. 4,053,994 tends to make the task of studying a group of educational cards more fascinating to a child, it does not prevent the child from "cheating" by quickly flipping a particular card over to determine the answer without any mental effort before inserting the card into the upper slot of the disclosed device. There presently exists an unmet need for an educational machine which facilitates use of educational cards by children in order to prevent the children from looking at the answer side of each card without making a suitable amount of mental effort to recall or cognitively determine the correct answer to a question set forth on the front side of that card.

Accordingly, it is an object of the invention to provide a low cost, easy to use educational device for facilitating use of educational cards by children.

It is another object of the invention to provide an educational machine for use with educational cards which reduces the amount of necessary supervision of small children using the educational cards.

Still another object of the invention is to provide an educational machine for use with educational cards which makes it more difficult for students using the educational cards to determine answers to questions set forth on the educational cards without making a suitable amount of cognative effort to determine the correct answers.

SUMMARY OF THE INVENTION

Briefly described, and in accordance with one embodiment thereof, the invention provides an educational system including a plurality of cards arranged in a predetermined sequence and a machine for receiving, inverting, temporarily storing, and ejecting the inverted cards. Each of the cards has a front surface having information thereon corresponding to information on the back or reverse side of a preceding one of the cards. For example, the answer corresponding to the question on each card may appear on the back side of the preceding card in the sequence. Alternatively, the answer to each question on the front surface of each card may appear on the back side of a card which is located a predetermined number of cards below the subject card. The apparatus includes a housing having a first opening through which the cards are inserted, front side upward, by the user. The inserted card is passed into the housing, and is inverted. The apparatus causes an inverted card temporarily stored in the housing to be ejected from a second opening with its back side directed upward. The answer on the back side of the ejected card corresponds to the question set forth on the front side of the card being inserted. The cards are all ejected in the same sequence in which they are inserted, so that the programmed order of the deck of cards in maintained. In one embodiment of the invention, a thin continuous slot or channel connects the input and output openings of the housing, the length of the slot being such that the act of inserting a card with its front side directed upward pushes the leading edge of a previously inserted card out of the lower opening such that the back side is oriented upward. In another embodiment of the invention, powered rollers are utilized to advance an inserted card through a path which inverts each card and subsequently ejects that card with its opposite face upward in response to insertion of a subsequent card having a question on its front face corresponding to an answer on the back face of the card being ejected.

BRIEF DESCRIPTION OF THE DRAWINGS

FIG. 1 is a perspective view of one embodiment of the educational machine of the invention.

FIG. 2 is a sectional view taken along section lines 2—2 of FIG. 1.

FIG. 3A shows the front or question side of a typical card used in the educational machine of FIG. 1.

FIG. 3B shows the reverse or answer side of the card of FIG. 3A.

FIG. 4 is a modified front view of the educational machine of FIG. 1.

FIG. 5 is a schematic representation of another embodiment of an educational machine incorporating the present invention.

DESCRIPTION OF THE INVENTION

Referring now to the drawings, particularly FIGS. 1–4, educational machine 1 includes a card inverting section 3 and a card receiving tray 5 connected to card inverting section 3. Tray 5 has a notch 19 therein which permits easy removal of the deck of cards from tray 5 after they have all been fed into educational machine 1. Card inverting section 3 has a rear face 15, side faces 3 and 3A, and an optional front surface 11 (which is omitted from the modified front view of FIG. 4). Card inverting section 3 further includes a pair of spaced curved members 17 and 18 supported between end faces 3 and 3A. Outer and inner curved members 17 and 18, respectively, are approximately U-shaped, and are spaced from each other by a small uniform distance, which is indicated by arrows 20. Rear face 15 extends from the bottom of educational machine 1 to abut the rearmost portion of outer curved member 17.

Thus, it is seen that a narrow, uniform width U-shaped channel 21 is formed by the gap between inner curved member 18 and outer curved member 17, which in combination, form an inverting means. One end of channel 21 terminates at upper slot 7 and the other end terminates at lower slot 9, as clearly shown in FIG. 4. Upper slot 7 is referred to as the "insertion slot". Lower slot 9 is referred to as the "exit slot", and forms an ejecting means.

Referring to FIG. 1, a dial apparatus is disposed on side face 3, which dial apparatus includes a knob 24 and a window display 25. By rotating knob 24, numerals can be made to sequentially appear in window display 25. Referring now to FIG. 2, a bell 27 and a pivotally mounted striker 28 are attached to the lower surface of outer curved member 17. Striker 28 is activated by lever extension 29 which extends into channel 21 and is displaced when a card is forced through channel 21, as subsequently described.

Educational machine 1 is utilized in conjunction with a plurlity of cards arranged in a predetermined sequence to form a deck of cards (not shown). (The cards are preferably made of material which is sufficiently durable and flexible that they can be passed through U-shaped channel 21 and returned to their original flat configuration and experience no damage to their edges as they are pushed through the U-shaped channel 21.) Each of the cards has a front or question side and a reverse or answer side. However, the answer on the reverse side of each card does not correspond to the question on the front side of that same card, but instead corresponds to the question on the front side of a subsequent card in the predetermined sequence.

The first card of the deck has no question on its front face, but has an answer on its reverse face corresponding to the question on the front face of the second card. The last card of each deck has the last question of the series on its front face, but no answer on its reverse face. All of the cards in the deck are arranged so that their front or question sides are oriented upward, and so that the printed matter is oriented in the same direction, i.e., so that the top edges are all aligned. If desired, the front and reverse sides of the cards can be color coded to make it easier for children to keep the cards properly arranged and aligned.

FIGS. 3A and 3B disclose the front and reverse sides of card 31, shown in FIG. 1 (and also in FIG. 5). Front side 31A of card 31 has a question (which is designated question #5) written thereon; the reverse side 31B of card 31 has an answer (designated answer #6), written thereon. However, answer #6 is not the answer to question #5, but instead is the answer to a question (e.g., question #6) printed on the front side of the next card (not shown) in the sequence of cards being fed from the above deck into insertion slot 7 of educational machine 1.

With the above information in mind, the use of educational machine 1 in conjunction with the described deck of cards now will be explained. Cards are taken in order from the deck and are inserted into insertion slot 7 of educational machine 1, as illustrated in FIG. 1; a particular card is pushed into insertion slot 7 in the direction indicated by arrow 35. The thickness of the cards is such that they can be easily inserted into channel 21 through slot 7.

For example, a first card 33 from the deck is pushed completely into insertion slot 7. (It should be noted that the cards are made of a material which is sufficiently thick and sufficiently flexible that the card moves freely around the U-shaped channel or path 21. The thickness of each card is uniform, and is substantially greater than half of the gap height of channel 21). The next or second card from the deck is then inserted a short distance into slot 7 so that the leading edge of second card 31 pushes the trailing edge of the first card further through the U-shaped channel 21, causing the leading edge of the first card to displace lever 9, which in turn displaces striker 28, causing striker 28 to ring bell 27. The leading edge (i.e. reference numeral 30 in FIG. 1) of the second card is pushed sufficiently far into insertion slot to cause the leading edge (i.e. reference numeral 33A in FIG. 1) of the first card to extend approximately half an inch out of exit slot 9. The U-shaped channel, of course, inverts each card which passes through channel 21 from insertion slot 7 to exist slop 9 so that its reverse or answer side is readily viewable by the user as that card is pulled out of exit slot 9.

At this point, the front or question side 31A of second card 31 is exposed so that the question thereon (question #5) can be easily read by the person using educational machine 1. The sound of bell 27 alerts the user to grasp the extending leading edge 33A of first card 33 and pull it out of exit slot 9 in the direction indicated by arrow 36. This exposes the reverse side 33C of first card 33 to the user, so that he can easily read the answer (answer #5) to the still exposed question (question #5) on second card 31. Thus, it is seen that educational machine 1 always causes a delay to occur between the time at which the user reads the question (Question No. 5) on side 31A of card 31 (before he pushes the leading edge of card 31 into insertion slot 7) and the time at which the user can read the corresponding answer (Answer No. 5) on side 33C of card 33 (after the user pulls card 33 out of exit slot 9).

After the user pulls first card 33 out of exit slot 9 in the direction indicated by arrow 36, he merely drops it into tray 5, pushes second card 31 all the way into insertion slot 7 and partially inserts the next card (not shown) from the deck, thereby causing its leading edge to advance second card 31 so that its leading edge activates striker 28 and sounding bell 27 and causes leading edge 30 of second card 31 to extend out of exit slot 9.

The above described sequence of operations is continued until all the cards in the deck have been inserted into insertion slot 7. The last card of the deck is removed from the U-shaped channel 21 by means of a dummy card, which remains in the U-shaped channel while it is not in use.

It should be noted that if the cards are numbered, knob 24 can be turned so that the card number appears in window 25.

The user should make a reasonable effort to recall or mentally determine the answer to the question presented by each card before partially inserting it and drawing the preceding inverted card from the exit slot 9 in order to obtain maximum benefit from use of the education machine 1.

The above device and method make use of flash cards more beneficial to children (and others) by making the use of flash cards more interesting, thereby overcoming some of the previously mentioned shortcomings of the prior art systems. The children's coordination and concentration skills are developed by the physical activity required to use the machine in addition to the mental skills developed by the cognative or recall effort required.

The device can be manufactured at very low cost, the device described herein being made of plastic. The cards utilized and described in the embodiment of the invention are three inches by seven inches and are approximately 40 mils in thickness, although other suitable dimensions could be readily utilized.

Another mechanized embodiment of the invention is schematically illustrated in FIG. 5, wherein a pair of nip rollers 40 and 41 are powered by a motor 45 to automatically draw a card inserted between nip rollers 40 and 41 completely through nip rollers 40 and 41, pushing the card through U-shaped channel 21, after elasping of a first predetermined amount of delay. U-shaped channel 21, of course, inverts the card as it passes from point 21A to 21B. A lower pair of nip rollers 46 and 47 is powered by motor 51 to automatically eject a card previously located in U-shaped channel 21.

Dotted line 60 represents the mechanical gearing which causes nip rollers 40 and 41 to rotate in the directions indicated by arrows 42 and 43, respectively, when motor 45 is energized. Dotted line 61 represents gearing which causes nip rollers 46 and 47 to rotate in the directions indicated by arrows 49 and 50, respectively, when motor 51 is energized. Motor 45 is energized by means of conductor 52 in response to a control unit 53; the motor 51 is similarly energized in response to a signal produced on conductor 58 by control unit 53.

As the leading edge of card 31 in FIG. 5 is pushed between nip rollers 40 and 41, switch 55 is activated, causing control unit 53 to be activated. The leading edge 33A of previous card 33 which is already located in U-shaped channel 21, has been advanced sufficiently far through channel 21 to engage lower nip rollers 46 and 47 before the above activating of switch 55. After a second predetermined delay from the activating of switch 55 (established by circuitry in control unit 53) sufficiently long for the user to attempt to recall or determine the correct answer to the question (question #5) of front side 31A of card 31, control unit 53 energizes motor 51 by means of a signal on conductor 58, causing lower nip rollers 46 and 47 to completely eject card 33, exposing the answer (answer #5) on reverse side 33D of card 33, that answer being the answer to the question (question #5) on front side 31A of card 31.

Shortly thereafter, control unit 53 energizes motor 45, causing card 31 to be advanced into U-shaped channel 21 a sufficient distance that it leading edge 30 engages lower nip rollers 46 and 47.

The details of control unit 53 can readily be provided by those skilled in the electronic art, and therefore are not set forth herein.

It should be readily apparent that numerous alternative embodiments of the described invention may be provided by those skilled in the art without departing from the spirit and scope of the invention. For example, numerous other means of inverting the cards after they are inserted into the insertion slot and before they are exited through the exit slot can be provided by those skilled in the art. For example, the card inverting system disclosed in U.S. Pat. No. 4,053,994, incorporated herein by reference, could be utilized. The answers to questions posed on the front side of a particular card in the deck could be provided on the reverse side of cards further removed in the deck rather than the immediately preceding card. Further, different types of associational relationships can be utilized. For example, questions can be replaced by pictures, and answers can be replaced by identifying words or symbols.

I claim:

1. An educational system comprising in combination:
   (a) a deck of cards arranged in a predetermined sequence, each of said cards having a first side with an item of information thereon and a second side with another item of information thereon, the information on the first side of any particular one of said cards comprising question information corresponding to response information on the second side of a preceding one of said cards, said preceding card being either adjacent to said particular one of said cards or separated therefrom by a predetermined number of said cards;
   (b) a housing having a first opening through which said particular one of said cards can be inserted into said housing, said housing having a second opening through which said particular card is subsequently ejected from said housing, said particular card being oriented so that the first side thereof is easily viewable by a user as said particular card is inserted into said first opening, said particular card being inserted into said first opening after said preceding can is, inserted into said first opening;
   (c) inverting means in said housing for inverting said preceding card within said housing after said first card is inserted through said first opening into said housing; and
   (d) ejecting means for receiving said preceding card from said inverting means and responding to insertion of said particular card through said first opening to partially eject said preceding card from said housing, said information on the second side of said inverted, partially ejected preceding card not being visible to the user until the user grasps an edge of said inverted, partially ejected preceding card and pulls it out of said second opening,
   said inverting means and said ejecting means operating to cause a substantial amount of delay between the time at which said preceding card is inserted into said first opening and at the time at which said preceding card is removed from said second opening to expose the information on the second side of said preceding card to the user.

2. The educational system of claim 1 wherein said question information on the first side of each card being a question and the response information on the second side of that card being an answer corresponding to a question on another of said cards.

3. The educational system of claim 2 wherein the first card of said deck has no question on its first side and the last card of said deck has no answer on its second side.

4. The educational system of claim 2 wherein the first sides of said cards are colored differently than the second sides of said cards, thereby making it easier for children to keep the cards properly aligned.

5. The educational system of claim 2 further including a dummy card which can be inserted to cause the last card of said deck to be ejected from said housing.

6. The educational system of claim 1 wherein said first opening is a substantially rectangular insertion slot.

7. The educational system of claim 6 wherein said inverting means includes a U-shaped channel having a substantially elongated rectangular cross-sectional area, said U-shaped channel having an end adjacent said insertion slot.

8. The educational system of claim 7 wherein said ejecting means includes an end portion of said U-shaped channel and an exit slot which is substantially rectangular adjacent said end portion of said U-shaped channel, whereby a card in said U-shaped channel is pushed through and out of said U-shaped channel by a leading edge of another card subsequently inserted into said U-shaped channel.

9. A method of utilizing a plurality of cards as an educational system, said cards being sequentially arranged to form a deck of cards, said method comprising the steps of:
(a) inserting a particular one of said cards into a machine, each of said cards having a first side with an item of information thereon and a second side with another item of information thereon, the information on the first side of any particular one of said cards comprising question information corresponding to response information on the second side of a preceding one of said cards, said preceding card being either adjacent to said particular one of said cards or separated therefrom by a predetermined number of said cards;
(b) observing or reading said information on the first side of said particular card and inserting said preceding card into the machine;
(c) inverting said preceding card within the machine;
(d) ejecting a portion of said preceding card from the machine in response to said inserting of said particular card so that said information on the second side of said preceding card is not visible to a user of said machine;
(e) grasping said portion of said preceding card and pulling said preceding card out of said machine, said information on the second side of said preceding card being easily viewable by the user as the user pulls said preceding card out of said machine; and
(f) repeating the sequence of steps (a) through (d) for a third card which is adjacent to or separated by said predetermined number of said cards from said particular card.

10. The method of claim 9 wherein said question information on the first side of each card is a question, the information on the response second side of each card is an answer, the answer on any particular one of said cards being an answer to a question on one of said cards which is to be inserted after that particular one of said cards.

11. An educational system comprising in combination:
(a) a deck of cards arranged in a predetermined sequence, each of said cards having a first side and an item of information thereon, each of said cards having a second side and an item of information thereon, information on the first side of a first one of said cards corresponding to said information on the second side of a second one of said cards, said second card being adjacent to said first card;
(b) a housing having a first opening through which said first one of said cards can be inserted into said housing, said housing having a second opening through which said first card is subsequently ejected from said housing, said first card being oriented so that the first side of said first card is easily viewable by a user as said first card is inserted into said first opening;
(c) inverting means in said housing for inverting said first card within said housing after said first card is inserted through said first opening into said housing;
(d) ejecting means for receiving said first card from said inverting means and responding to insertion of said second card through said first opening to eject said first card from said housing; and
(e) first means for automatically drawing said first card into said housing and into said inverting means through said first opening a first predetermined amount of time after inserting an edge of said first card into said first opening, said ejecting means including second means for automatically ejecting a second card from said housing a second predetermined time after said inserting of said edge into said first opening, said first predetermined time being greater than said second predetermined time.

12. The educational system of claim 11 wherein said first means and said second means each include a pair of powered nip rollers.

* * * * *